US012518765B2

(12) United States Patent
Lee

(10) Patent No.: US 12,518,765 B2
(45) Date of Patent: Jan. 6, 2026

(54) DISPLAY DEVICE AND OPERATING METHOD THEROF

(71) Applicant: LG ELECTRONICS INC., Seoul (KR)

(72) Inventor: Sangseok Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 356 days.

(21) Appl. No.: 18/125,415

(22) Filed: Mar. 23, 2023

(65) Prior Publication Data

US 2024/0055005 A1 Feb. 15, 2024

(30) Foreign Application Priority Data

Aug. 10, 2022 (KR) .................. 10-2022-0100207

(51) Int. Cl.
*G10L 17/22* (2013.01)
*G10L 17/02* (2013.01)
(Continued)

(52) U.S. Cl.
CPC .............. *G10L 17/22* (2013.01); *G10L 17/02* (2013.01); *G10L 21/028* (2013.01); *H04N 21/42203* (2013.01); *H04N 21/4312* (2013.01)

(58) Field of Classification Search
CPC ...................................................... G10L 17/22
(Continued)

(56) References Cited

U.S. PATENT DOCUMENTS

2012/0316876 A1* 12/2012 Jang .................. H04N 21/42203
704/E15.001
2015/0154957 A1* 6/2015 Nakadai .................. G10L 15/26
704/235
(Continued)

FOREIGN PATENT DOCUMENTS

EP 4322538 A1 * 2/2024 ............. G10L 15/00
KR 10-2020-0084413 7/2020
(Continued)

OTHER PUBLICATIONS

L. Yang, Z. Zhao and G. Min, "User Verification Based on Customized Sentence Reading," 2018 IEEE 16th Intl Conf on Dependable, Autonomic and Secure Computing, 16th Intl Conf on Pervasive Intelligence and Computing, 4th Intl Conf on Big Data Intelligence and Computing and Cyber Science and Technology (Year: 2018).*
(Continued)

*Primary Examiner* — Bharatkumar S Shah
(74) *Attorney, Agent, or Firm* — LEE, HONG, DEGERMAN, KANG & WAIMEY

(57) ABSTRACT

Disclosed are a display device and an operating method therefor. According to an aspect of the present disclosure, a method for operating a display device includes receiving voice data; separating the received voice data into pieces of voice data for a plurality of speakers; and performing control such that pieces of content respectively corresponding to the pieces of voice data, which have been separated for the plurality of speakers, are respectively output on corresponding screen areas of multi-view screen areas, when a current playback mode is a multi-view mode.

15 Claims, 14 Drawing Sheets

(51) Int. Cl.
*G10L 21/028* (2013.01)
*H04N 21/422* (2011.01)
*H04N 21/431* (2011.01)

(58) Field of Classification Search
USPC .......................................................... 704/235
See application file for complete search history.

(56) References Cited

U.S. PATENT DOCUMENTS

| | | | |
|---|---|---|---|
| 2018/0017670 A1* | 1/2018 | Leigh | G01S 5/14 |
| 2018/0124385 A1* | 5/2018 | Van Beek | H04N 9/12 |
| 2018/0182380 A1* | 6/2018 | Fritz | G10L 15/30 |
| 2022/0045776 A1 | 2/2022 | Choi et al. | |
| 2022/0115020 A1* | 4/2022 | Bradley | G06F 3/0334 |
| 2023/0209126 A1 | 6/2023 | Park et al. | |

FOREIGN PATENT DOCUMENTS

| | | |
|---|---|---|
| KR | 10-2022-0031367 | 3/2022 |
| WO | 2022-050785 | 3/2022 |

OTHER PUBLICATIONS

European Patent Office Application Serial No. 23157665.3, Search Report dated Nov. 21, 2023, 8 pages.
Korean Intellectual Property Office Application No. 10-2022-0100207, Office Action dated Sep. 1, 2025, 7 pages.

* cited by examiner

FIG. 8
(a) 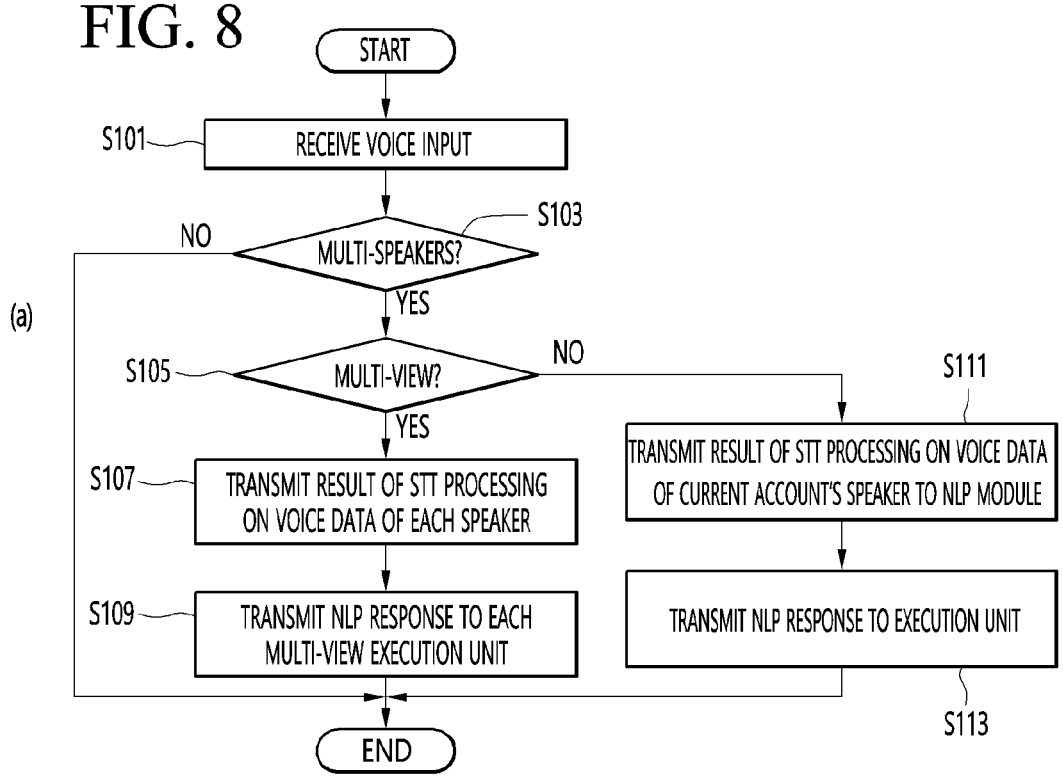
(b) 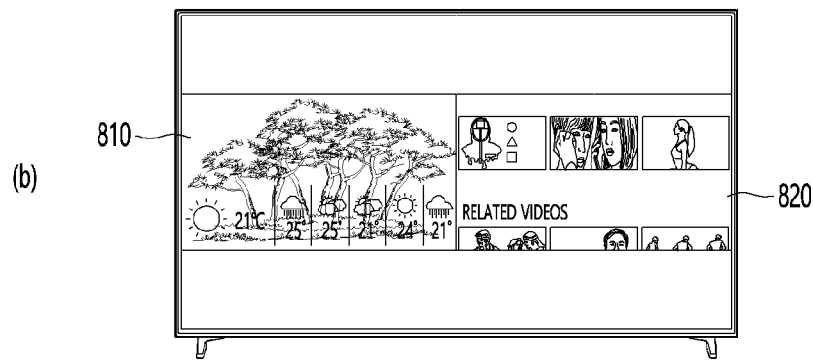
(c) 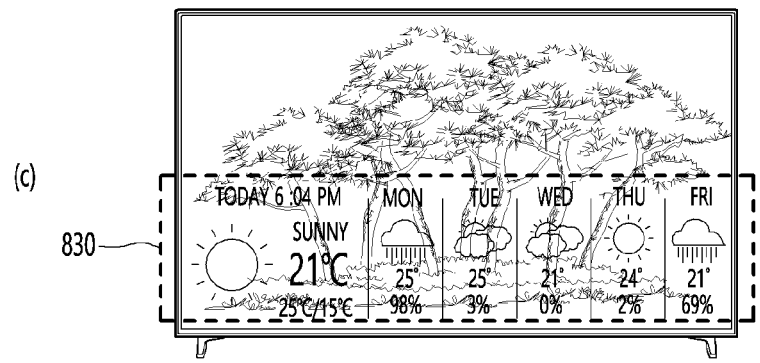

FIG. 9
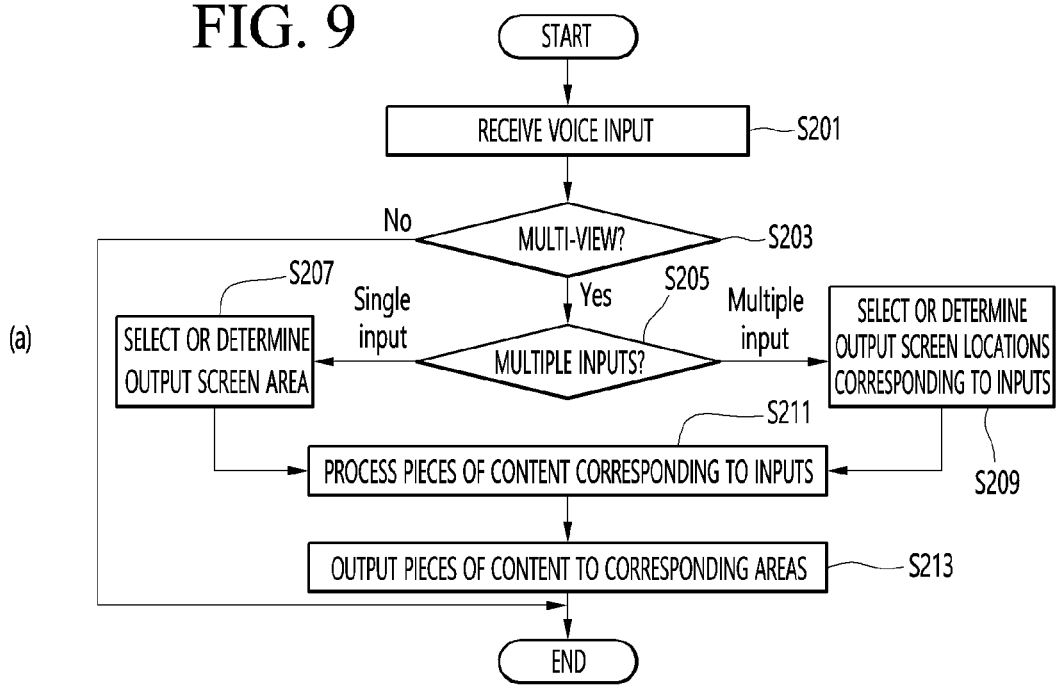
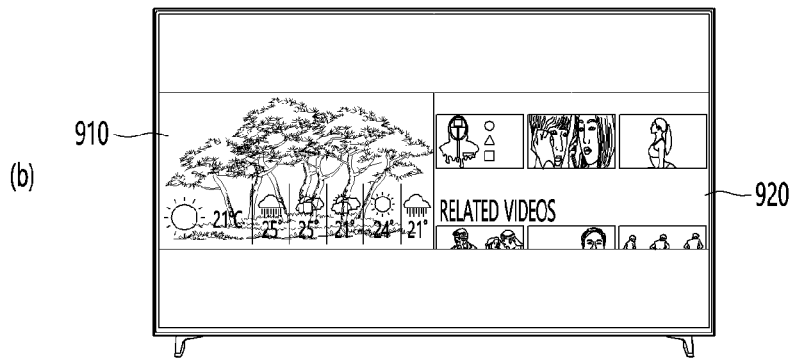
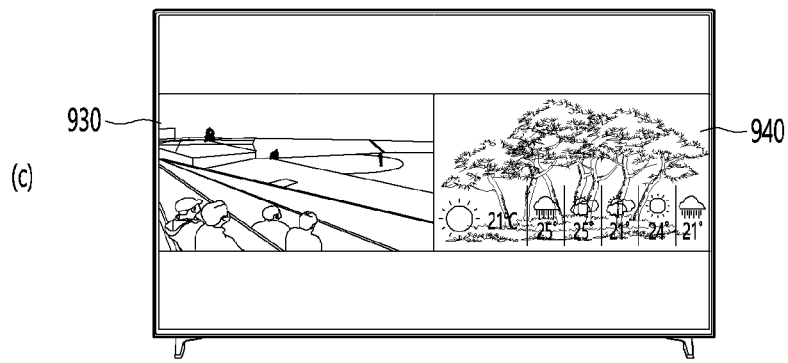

FIG. 11
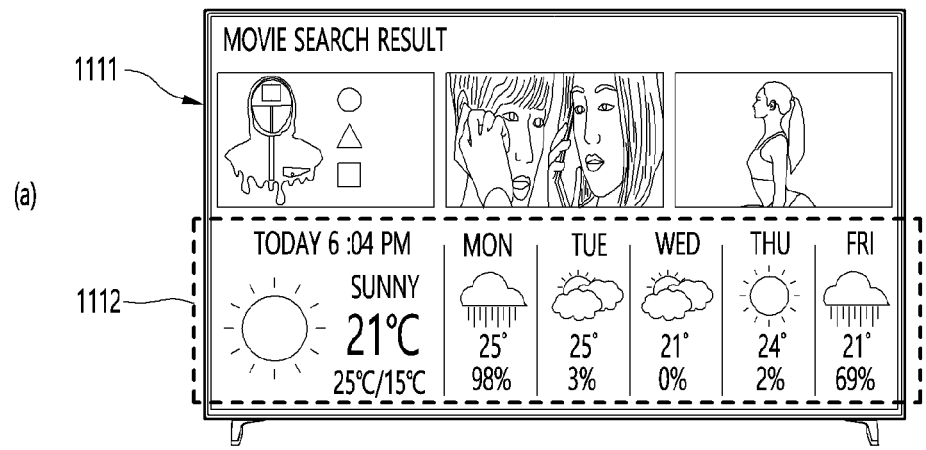
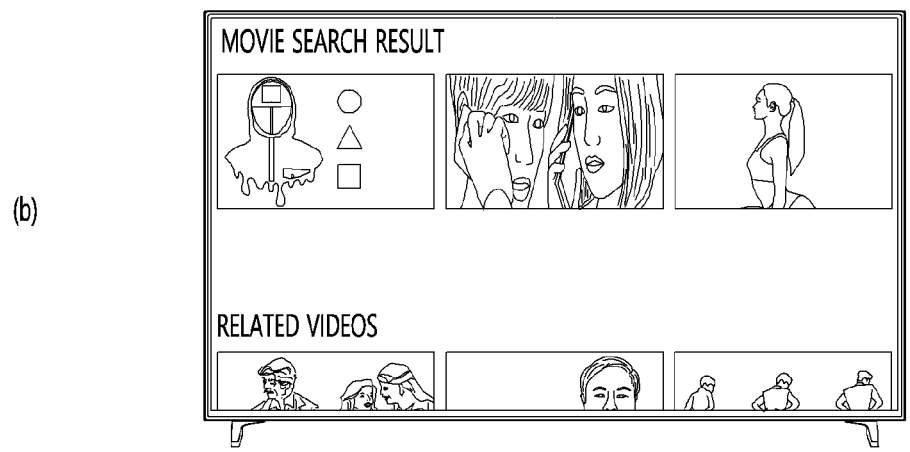
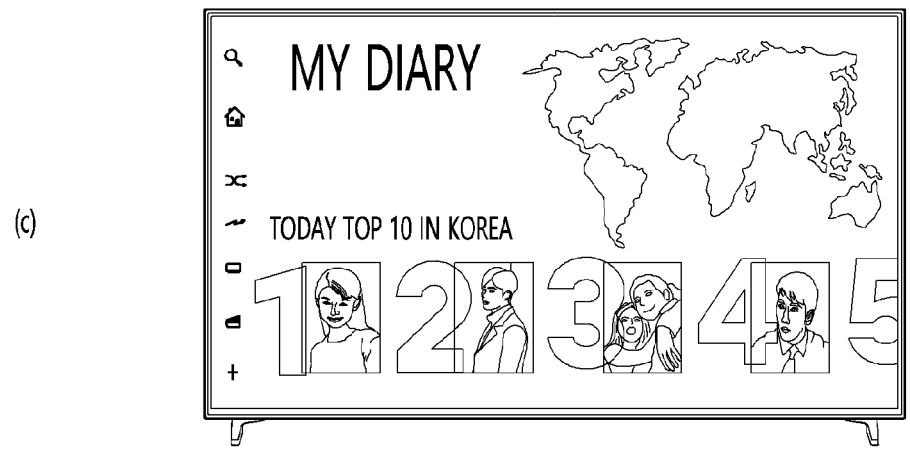

FIG. 13
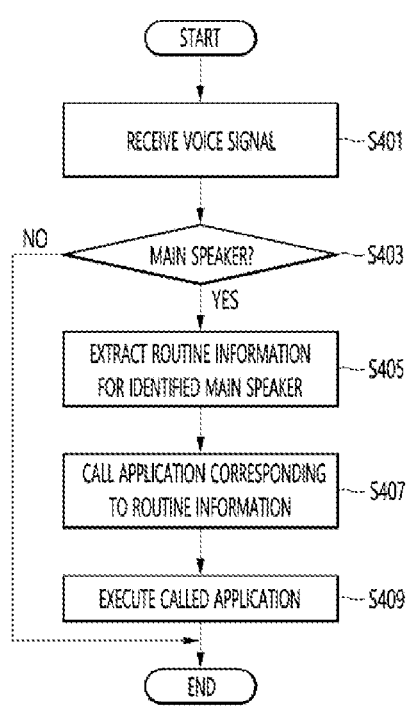
(a)
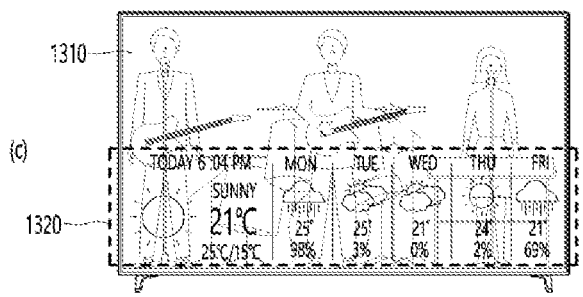
(b)
(c)
(d)

DISPLAY DEVICE AND OPERATING METHOD THEROF

CROSS-REFERENCE TO RELATED APPLICATIONS

Pursuant to 35 U.S.C. § 119(a), this application claims the benefit of earlier filing date and right of priority to Korean Patent Application No. 10-2022-0100207, filed on Aug. 10, 2022, the contents of which are hereby incorporated by reference herein in its entirety.

BACKGROUND OF THE INVENTION

1. Field of the Invention

The present disclosure relates to a display device and an operating method thereof.

2. Discussion of the Related Art

A remote controller is mainly used as an input interface for a conventional display device. That is, when a user requests a function by pressing various input buttons provided on the remote control, the display device performs an operation corresponding to the request.

With the rapid development of digital technology, as content is produced in high-spec and high-definition, the display device is also developing accordingly. Conventionally, it is inconvenient to control the display device as desired by a user through a button provided in the remote control or through gesture recognition through the remote control.

Accordingly, input technology through voice recognition has been adopted in display devices. However, the conventional voice recognition technology has difficulty in accurately recognizing a user's voice in various situations. In particular, for example, when an unintended sound source is recognized because a nearby interference sound source is introduced upon voice recognition, there is a problem of performing the voice recognition process repeatedly.

In order to solve this problem, there is a method of removing a small level of input source when a level difference between input sound sources is large as one of the methods of removing the interference sound source, but there is still a limit.

SUMMARY OF THE INVENTION

An object of the present disclosure is to perform voice recognition processing by identifying a plurality of speakers in a display device when the speakers speak.

Another object of the present disclosure is to provide a service that matches a user's intention for a display device through voice recognition processing based on information on identification of speakers to increase convenience of use and product satisfaction.

According to an aspect of the present disclosure, a method for operating a display device includes receiving voice data; separating the received voice data into pieces of voice data for a plurality of speakers; and performing control such that pieces of content respectively corresponding to the pieces of voice data, which have been separated for the plurality of speakers, are respectively output on corresponding screen areas of multi-view screen areas, when a current playback mode is a multi-view mode.

According to an aspect of the present disclosure, a method for controlling an operation of a display device in a server includes receiving pieces of voice data for a plurality of speakers; performing Speech-to-Text (STT) processing on each of the pieces of voice data for the plurality of speakers; performing natural language processing (NLP) on text data on which STT processing has been performed; generating content information on data on which NLP has been performed; and performing control such that pieces of content according to NLP are respectively output to multi-view screen areas, when a current playback mode of the display device is a multi-view mode.

According to an aspect of the present disclosure, a display device includes a memory; and a processor configured to communicate with the memory, wherein the processor is configured to separate input voice data into pieces of voice data for a plurality of speakers and perform control such that pieces of content respectively corresponding to the pieces of voice data, which have been separated for the plurality of speakers are respectively output on corresponding screen areas of multi-view screen areas, when a current playback mode is a multi-view mode.

BRIEF DESCRIPTION OF THE DRAWINGS

FIGS. 8 to 14 are diagrams for describing a method of processing multi-speaker data according to an embodiment of the present disclosure.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBB TV, smart TV, LED TV, OLED TV, and the like, and may be applied to a smart phone in some cases.

Figure 1:
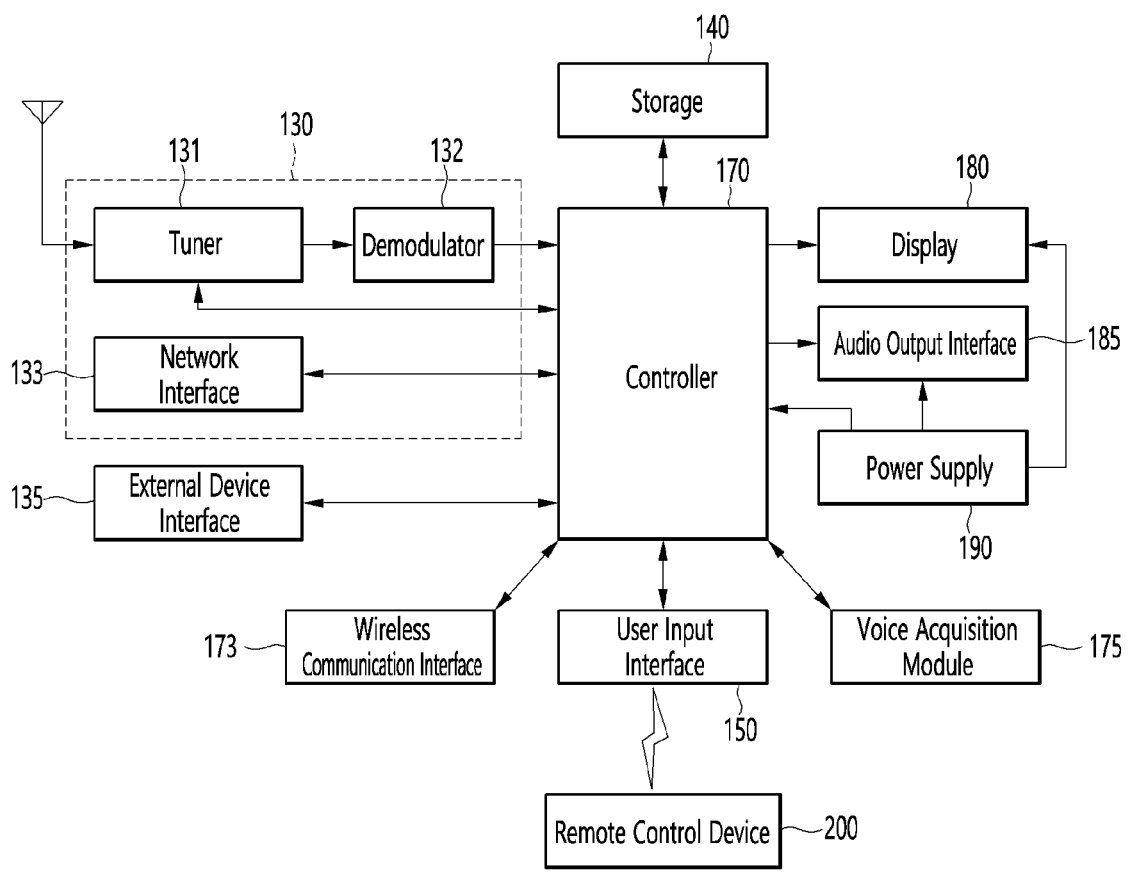
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a microphone 175, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The network interface 133 may provide an interface for connecting the display device 100 to a wired/wireless network including an Internet network. The network interface 133 may transmit or receive data to or from other users or other electronic devices through a connected network or another network linked to the connected network.

The network interface 133 may access a predetermined web page through the connected network or the other network linked to the connected network. That is, it is possible to access a predetermined web page through a network, and transmit or receive data to or from a corresponding server.

Then, the network interface 133 may receive contents or data provided from a content provider or a network operator. That is, the network interface 133 can receive content such as movies, advertisements, games, VODs (Video on Demands), and broadcast signals, which are provided from a content provider or a network provider, through network and information relating thereto.

In addition, the network interface 133 may receive update information and update files of firmware provided by the network operator, and may transmit data to an Internet or content provider or a network operator.

The network interface 133 may select and receive a desired application from among applications that are open to the public through a network.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is an example.

In addition, some content data stored in the display device 100 may be transmitted to another user registered in advance in the display device 100 or a selected user or a selected electronic device among other users or other electronic devices.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a Ultra Wideband (UWB) communication method, a ZigBee communication method, a Radio Frequency (RF) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), UWB, ZigBee, Near Field Communication (NFC), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The microphone 175 may acquire audio. The microphone 175 may include at least one microphone (not shown), and may acquire audio around the display device 100 through the microphone (not shown).

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

Unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

The speaker 185 may receive a signal audio-processed by the controller 170 and output the same with audio.

The power supply circuit 190 may supply corresponding power to the display device 100. Particularly, power may be supplied to the controller 170 that may be implemented in the form of a system on chip (SOC), the display 180 for image display, and the speaker 185 for audio output.

Specifically, the power supply circuit 190 may include a converter that converts AC power into DC power, and a dc/dc converter that converts a level of DC power.

Next, a remote control device according to an embodiment of the present disclosure will be described with reference to FIGS. 2 to 3.

Figure 2:
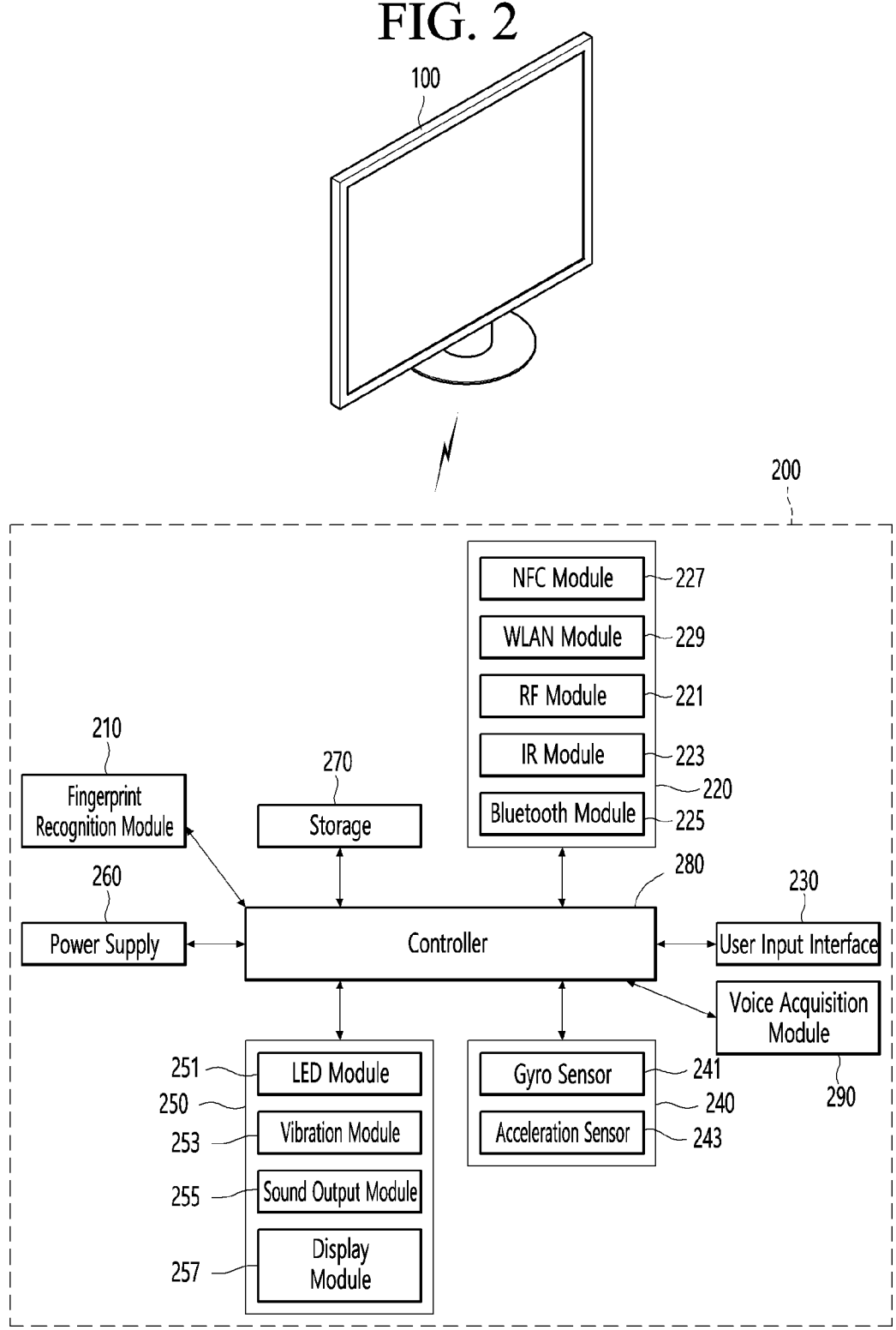
FIG. 2 is a block diagram of a remote control device according to an embodiment of the present disclosure.
Figure 3:
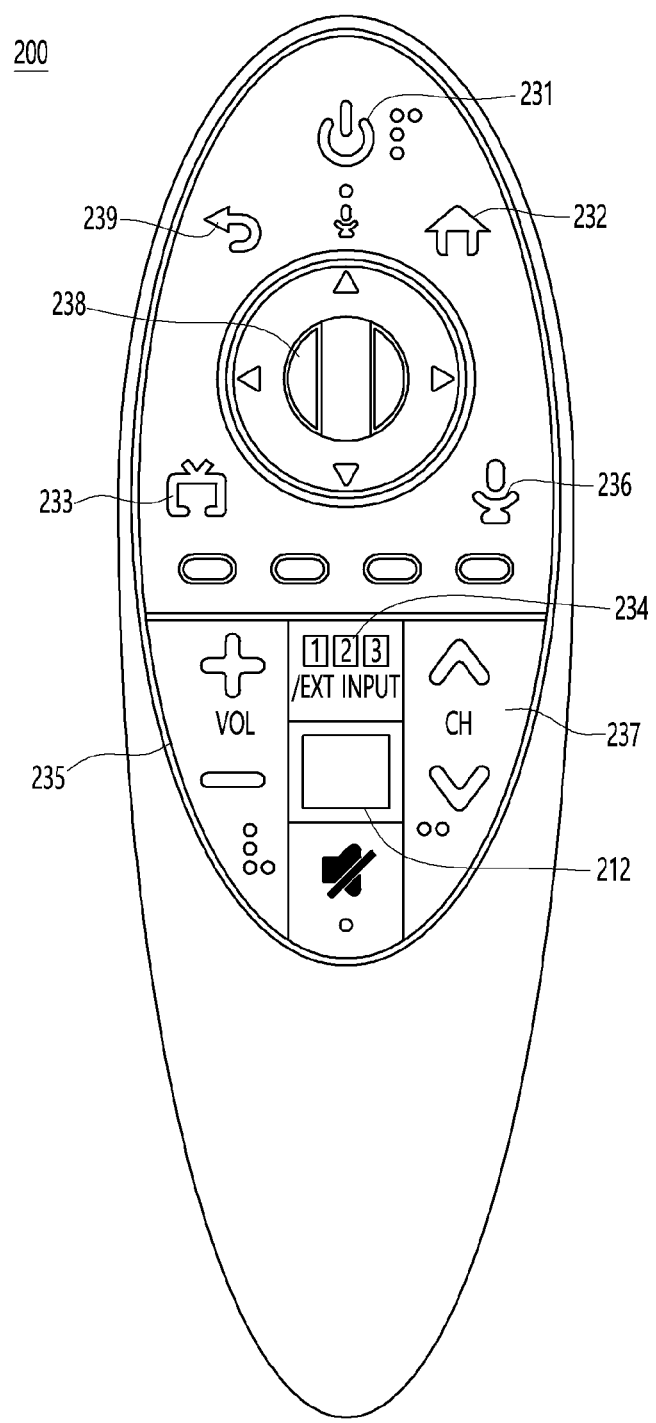
FIG. 3 illustrates an example of an actual configuration of a remote control device according to an embodiment of the present disclosure.

FIG. 2 is a block diagram of a remote control device according to an embodiment of the present disclosure, and FIG. 3 illustrates an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC communication standard, and a WLAN circuit 229 capable of transmitting and receiving signals to and from the display device 100 according to the WLAN communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100. The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication circuit 220.

In addition, the power supply circuit 260 may supply power to the remote control device 200, and stop power supply when the remote control device 200 has not moved for a predetermined time to reduce power consumption. The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication circuit 220.

Also, the microphone 290 of the remote control device 200 may obtain a speech.

A plurality of microphones 290 may be provided.

Next, a description will be given referring to FIG. 4.

Figure 4:
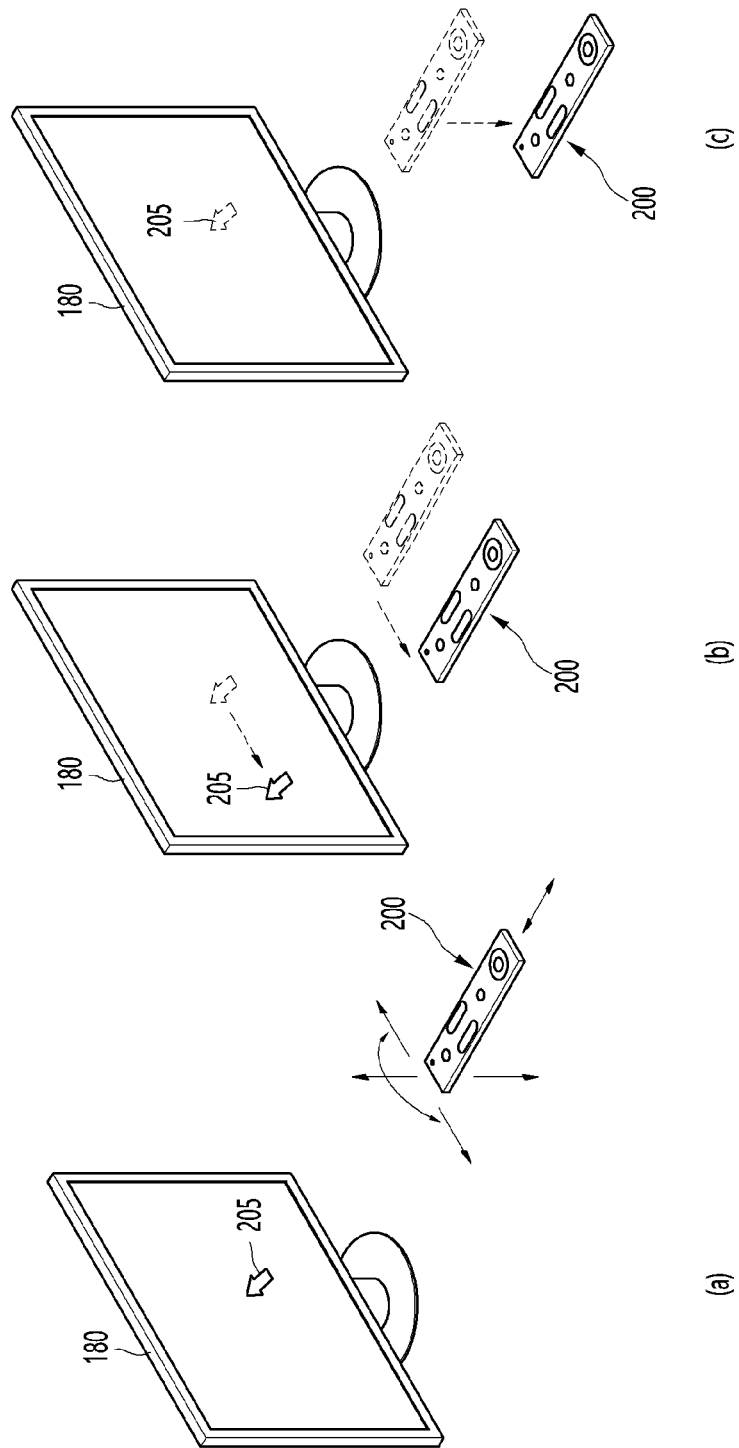
FIG. 4 illustrates an example of using a remote control device according to an embodiment of the present disclosure.

FIG. 4 illustrates an example of using a remote control device according to an embodiment of the present disclosure.

In FIG. 4A, it is illustrated that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In FIG. 4B, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In FIG. 4C, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and the forward and backward movements may be recognized. In a state in which a specific button in the remote control device 200 is not being pressed, the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5A:
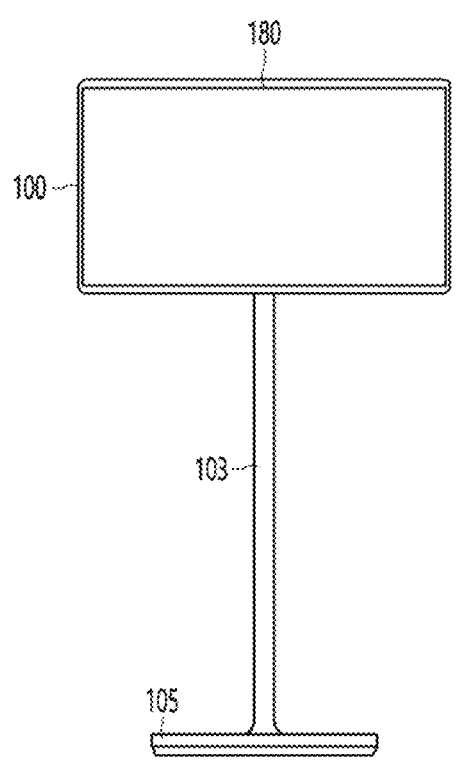
FIGS. 5A and 5B are diagrams for describing a horizontal mode and a vertical mode of a stand-type display device according to an embodiment of the present disclosure.
Figure 5B:
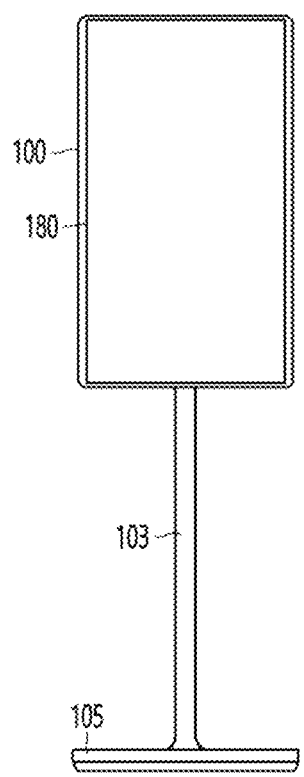

FIGS. 5A and 5B are diagrams for describing a horizontal mode and a vertical mode of a stand-type display device according to an embodiment of the present disclosure.

Referring to FIGS. 5A and 5B, a stand-type display device 100 is illustrated.

A shaft 103 and a stand base 105 may be connected to the display device 100.

The shaft 103 may connect the display device 100 and the stand base 105 to each other. The shaft 103 may extend vertically.

The lower end of the shaft 103 may be connected to the edges of the stand base 105.

The lower end of the shaft 103 may be rotatably connected to the edges of the stand base 105.

The display device 100 and the shaft 103 may rotate about a vertical axis with respect to the stand base 105.

An upper portion of the shaft 103 may be connected to the rear surface of the display device 100.

The stand base 105 may serve to support the display device 100.

The display device 100 may be configured to include the shaft 103 and the stand base 105.

The display device 100 may rotate around a point where the upper portion of the shaft 103 and the rear surface of the display 180 contact each other.

FIG. 5A illustrates that the display 180 operates in a landscape mode in which the horizontal length is greater than the vertical length, and FIG. 5B illustrates that the display 180 operates in a portrait mode in which the vertical length is greater than the horizontal length.

A user may move while holding a stand-type display device. That is, the stand-type display device has improved mobility, unlike a fixed device, so that a user is not limited by an arrangement position.

Next, various embodiments of processing a voice signal in the display device 100 will be described.

Hereinafter, the term "voice signal" may indicate a signal including voice data of a speaker (user) making a request to the display device 100.

In particular, in the present disclosure, a case in which pieces of voice data of at least two or more speakers (for example, referred to as 'multi-speakers' for convenience of description) is included in the voice signal is described as an example, but the present disclosure is not limited thereto.

When requests, that is, pieces of voice data are simultaneously received from multi-speakers, or received during a short time within a predetermined time range, the display device 100 may be configured to process the pieces of voice data as a single voice signal. In this case, the predetermined time range may indicate a time period, for example, from a point in time when the pre-input voice data is received to a point in time when the processing of the pre-input voice data is not yet performed in the display device 100. The voice signal may include pieces of voice data for at least two different requests from a single speaker rather than multi-speakers. Meanwhile, the voice data may include various requests such as a request for content or an application, a request for search or information provision, and the like.

When a voice signal including the pieces of voice data of the multi-speakers is input, the display device 100 may be configured to identify each multi-speaker from the voice signal, identify the voice data of each identified multi-speaker, and perform operation based on the current operating state of the display device 100 and the identified speaker or voice data.

Figure 6:
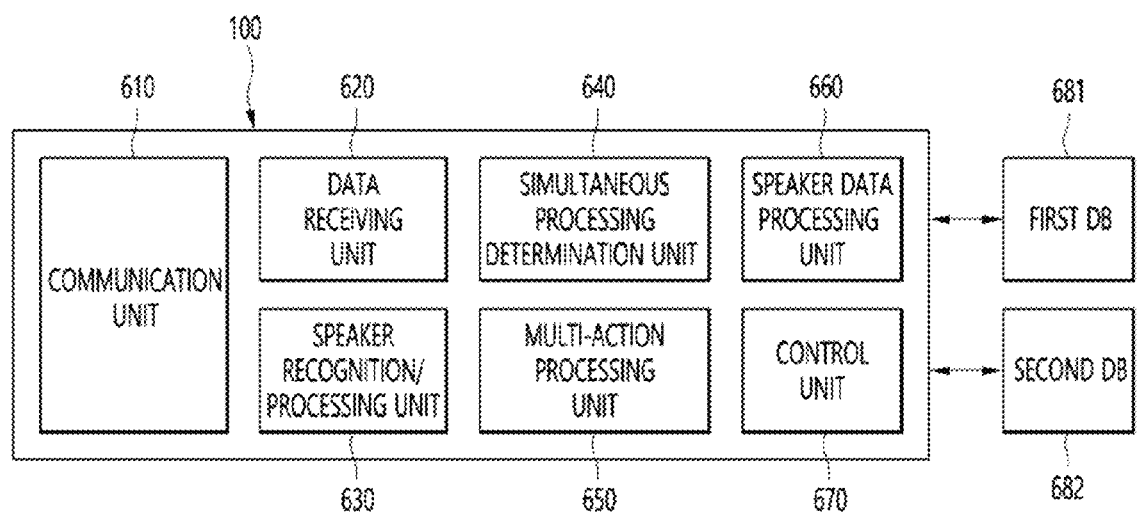
FIG. 6 is a block diagram illustrating a configuration of a display device according to another embodiment of the present disclosure.

FIG. 6 is a block diagram illustrating a configuration of a display device 100 according to another embodiment of the present disclosure.

Figure 7:
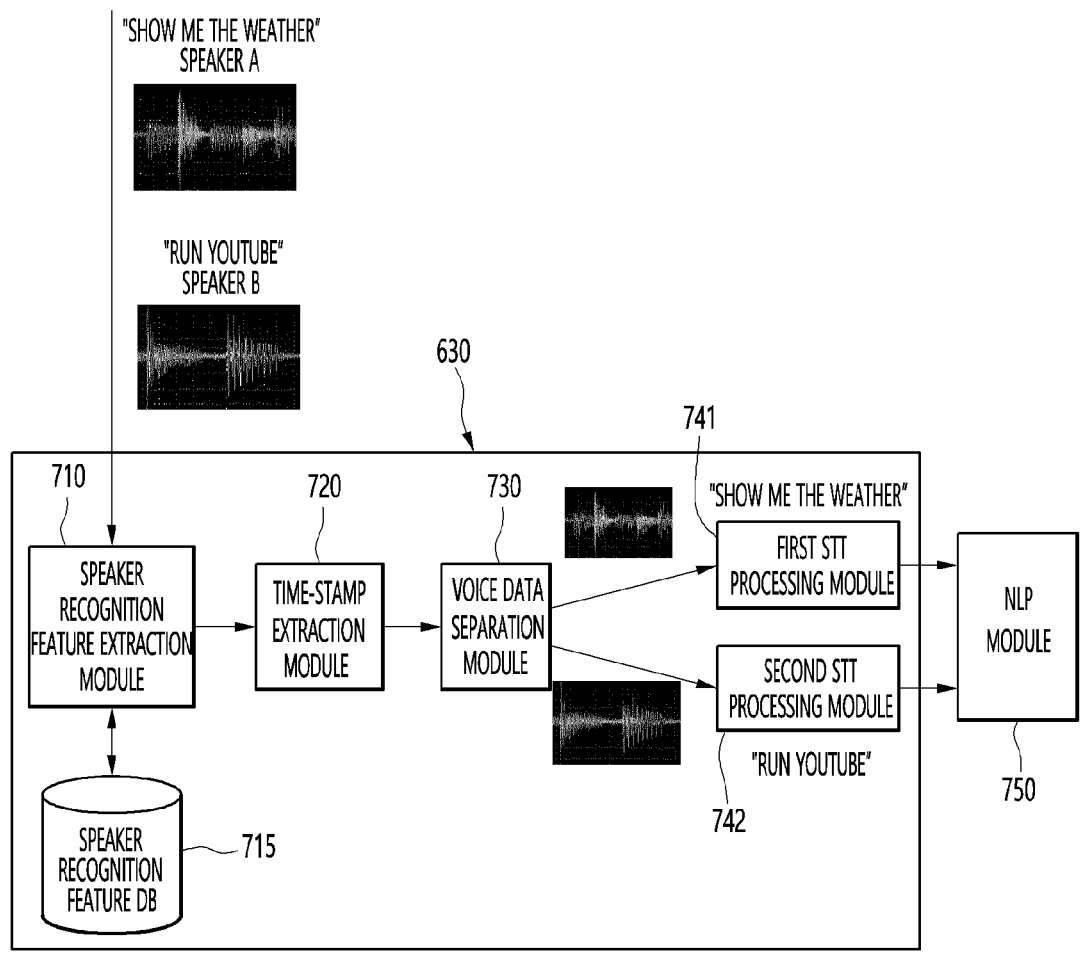
FIG. 7 is a diagram for describing a process of processing a multi-speaker data according to an embodiment of the present disclosure.

FIG. 7 is a diagram illustrating a process of processing voice data of multi-speakers according to an embodiment of the present disclosure.

The display device 100 may include a memory and a processor 600 communicating with the memory.

The processor 600 may be configured to separate input voice data into pieces of voice data for speakers, and process the voice data differently according to the current playback mode of the display device 100. For example, when the current playback mode of the display device 100 is a multi-view mode, the processor 600 may be configured to perform control such that the content according to the separated voice data of each multi-speaker is output to each multi-view screen area.

Meanwhile, the processor 600 may be configured to communicate with an internal or external DB, that is, a first DB 681 and a second DB 682 to perform data communication such as collecting, recording/storing, and extracting/reading data.

Referring to FIG. 6, the processor 600 may include a communication unit 610, a data receiving unit 620, a speaker recognition/processing unit 630, a simultaneous processing determination unit 640, a multi-action processing unit 650, a speaker data processing unit 660 and a control unit 670. The processor 600 may be configured to further include one or more other components in addition to the components shown in FIG. 6, or vice versa. Some of the components of the processor 600 shown in FIG. 6 may be implemented in a module form with other component(s), or vice versa. For example, at least two of the speaker recognition/processing unit 630, the simultaneous processing determination unit 640, the multi-action processing unit 650, and the speaker data processing unit 660 are modularized and exist individually or may be included in the control unit 670.

The communication unit 610 may be configured to support a communication interface environment with other components of the display device 100 or an external device (including a server).

The data receiving unit 620 may be configured to receive (or acquire) data from another component or an external device through the communication unit 610. In this case, the received data may include a voice signal including the voice data of the multi-speakers.

The speaker recognition/processing unit 630 may be configured to recognize multi-speakers in the voice signal received through the data receiving unit 620, identify each speaker in the recognized multi-speakers, separate the identified voice data of each speaker from the voice signal, and process the voice data for example, as shown in FIG. 7. At least a part of the process of recognizing speakers and performing processing may be performed by an external device, for example, a server.

Referring to FIG. 7, when a voice signal including "Show me the weather" (first voice data by speaker A) and "Run YouTube" (second voice data by speaker B) is received, the display device 100 (or the server) may be configured to recognize each multi-speaker and identify and process the voice data of the recognized each speaker.

Referring to FIG. 7, the speaker recognition/processing unit 630 in the processor 600 of the display device 100 may include a speaker recognition feature extraction module 710, a time-stamp extraction module 720, a voice data separation module 730, a first Speech to Text (STT) processing module 741 and a second STT processing module 742. The speaker recognition/processing unit 630 may be configured to further include one or more components differently from the configuration shown in FIG. 7 or vice versa. In addition, at least two or more of the speaker recognition feature extraction module 710, the time-stamp extraction module 720, the voice data separation module 730, the first STT processing module 741 and the second STT processing modules 742, which constitute the speaker recognition/processing unit 630, may be implemented as one module or vice versa.

The speaker recognition feature extraction module 710 may be configured to extract features for speaker recognition from a speaker recognition feature DB 715. In this case, the speaker recognition feature DB 715 may be included in the display device 100 or the speaker recognition/processing unit 630, but may be located remotely unlike the configuration illustrated in FIG. 7. For example, the speaker recognition feature DB 715 located remotely (e.g., at the server) may provide related (speaker) data according to the request of the speaker recognition/processing unit 630.

The time-stamp extraction module 720 may extract time-stamp information for a voice data section (e.g., a start section and an end section) corresponding to the extracted speaker recognition feature.

The voice data separation module 730 may be configured to perform separation into pieces of voice data for speakers, for example, the first voice data ("Show me the weather") of speaker A and the second voice data ("run YouTube") of speaker B, based on the time-stamp information.

The STT processing unit may be configured to perform STT processing on the separated voice data.

Referring to FIG. 7, the first STT processing module 741 may be configured to perform STT processing on the separated first voice data of the speaker A, and the second STT processing module 742 may be configured to perform STT processing on the separated second voice data of the speaker B.

The voice data of each speaker that has been separated as described above may be subjected to natural language processing (NLP) in an NLP module 750.

At least one of the STT processing unit and the NLP module 750 may be included in the display device 100 or the server.

On the other hand, the STT and NLP processes or algorithms are referred to the known technology, and a separate detailed description thereof is omitted herein.

The simultaneous processing determination unit 640 may be configured to determine whether pieces of voice data of multi-speakers are able to be simultaneously processed on the display device 100. The simultaneous processing determination unit 640 may be configured to perform a function when the playback mode of the display device 100 is a single-view mode rather than a multi-view mode, but the present disclosure is not limited thereto.

The simultaneous processing determination unit 640 may be configured to determine whether simultaneous output is possible in consideration of the relationship between the voice data of each multi-speaker and content currently being played. In this case, the simultaneous processing determination unit 640 may be configured to perform a function of determining whether simultaneous output is possible even when the playback mode of the display device 100 is a multi-view mode rather than a single-view mode. That is, for each multi-view screen area, the simultaneous processing determination unit 640 may be configured to determine whether content currently being output in a corresponding area and content according to the request (command) corresponding to the voice data of each multi-speaker are able to be output simultaneously or need to be replaced with each other.

The multi-action processing unit 650 may be configured to perform multi-action processing such that commands according to pieces of voice data of multi-speakers are processed together on the display device 100.

The speaker data processing unit 660 may be configured to process actual data according to the pieces of voice data of the multi-speakers.

The control unit 670 may be configured to control the overall operation of the processor 600, and in particular, perform control operation according to various situations for processing a voice signal including the pieces of voice data of multi-speakers.

The first DB 681 and the second DB 682 may be configured to perform operation of recording/storing or extracting/reading data, or the like through data communication with the processor 600. Any one of the first DB 681 and the second DB 682 may correspond to or include the speaker recognition feature DB 715 of FIG. 7.

FIGS. 8 to 14 are diagrams for a method of processing a voice signal including data of multi-speakers according to an embodiment of the present disclosure.

Hereinafter, for convenience of description, multi-speakers including two speakers will be described as an example, but the present disclosure is not limited thereto.

As used herein, the term 'content' may include any type of data capable of being played on a display, such as a broadcast program, an application, or an external input, unless otherwise specified.

The display device 100 may be configured to receive voice data, separate the received voice data into pieces of voice data for speakers, and when the current playback mode is a multi-view mode, perform control such that content according to each piece of voice data, which has been separated for each speaker is output to each multi-view screen area.

The display device 100 may be configured to extract speaker recognition feature information from the DB. Specifically, the display device 100 may be configured to extract time-stamp information on a part corresponding to the extracted speaker recognition feature information from the received voice data, and separate the voice data into pieces of voice data for speakers based on the extracted time-stamp information, thus enabling the received voice data to be separated into pieces of voice data for speakers.

The display device 100 may be further configured to perform STT processing on the voice data separated for each speaker based on the extracted time-stamp information, and perform NLP on the voice data of each speaker which has been subjected to STT processing to enable the received voice data to be separated into the pieces of voice data for speakers.

The display device 100 may be configured to determine a multi-view screen area corresponding to each voice data separated for each speaker and perform mapping.

The display device 100 may be configured to extract content information currently being played on each determined multi-view screen area.

The display device 100 may be configured to compare content information currently being played on each extracted multi-view screen area with content according to voice data mapped to a corresponding multi-view screen area, and determine whether simultaneous output is possible.

When an operation command (content) according to the voice data mapped to the multi-view screen area is able to be output simultaneously as a result of determining whether simultaneous output is possible, the display device 100 may be configured to output data according to the operation command on one area of the content screen being currently played in the corresponding screen area.

When an operation command (content) according to the voice data mapped to the multi-view screen area is unable to be output simultaneously as a result of determining whether simultaneous output is possible, the display device 100 may be configured to output data according to the operation command onto a corresponding screen area instead of content currently being played.

The display device 100 may be configured to determine whether a request according to each voice data separated for each speaker is a request incapable of being processed simultaneously, when it is determined that the request is a request incapable of being simultaneously being processed as a result of the determination, determine a main speaker, and activate a request according to voice data corresponding to the determined main speaker from among pieces of voice data separated for speakers.

The display device 100 may be configured to extract content information currently being played on each multi-view screen area, and determine a multi-view screen on which a request according to voice data corresponding to the activated main speaker it to be output, based on the extracted content information of each multi-view screen area. The display device 100 may be configured to determine whether simultaneous output is possible based on the content information of a multi-view screen on which the request according to the voice data corresponding to the main speaker is to be output and, when simultaneous output is possible, output the content according to the request onto one area on the content of the multi-view screen.

The display device 100 may be configured to upload voice data, separated for each speaker as described above, to a server, and download an NLP response, generated by performing NLP on the uploaded voice data, from the server.

The controlling the operation of the display device 100 in a server may comprise receiving voice data separated for each speaker from received voice data, performing STT processing and NLP on each voice data for each speaker, and generate and transmit information on each voice data which has been subjected to NLP, that is, an NLP response to the display device 100. In this case, when the current playback mode of the display device 100 is recognized as the multi-view mode, the server may perform control such that content corresponding to the generated NLP response is output to each multi-view screen area.

Referring to FIG. 8A, when a voice input is received (S101), the display device 100 may be configured to determine whether there are multi-speakers (S103). In this case, determination as to whether pieces of voice data of multi-speakers are included in the received input voice may be performed according to, for example, the related description of FIGS. 6 and/or 7 as described above.

When it is determined that the input voice includes the pieces of voice data of multi-speakers as a result of the determination in step S103, the display device 100 may be configured to determine whether the current playback mode of the display device 100 is the multi-view mode (S105).

When the current playback mode of the display device 100 is the multi-view mode as a result of the determination in step S105, the display device 100 may be configured to perform STT processing on each speaker's voice data and transmit the data that has been subjected to STT processing to the NLP (S107).

After transmitting the data to the NLP in step S107, the display device 100 may be configured to receive a result of STT processing, that is, an NLP response from the NLP, and perform control to output the NLP response to each multi-view screen area as shown in FIG. 8B (S109).

Referring to FIG. 7 and FIG. 8B, weather information is provided on a content playback screen in a first multi-view screen area 810, and an execution screen of YouTube application may be provided on a second multi-view screen area 820 instead of previously-provided content.

In FIG. 8, the display device 100 may be configured to omit step S105 and, when there are multi-speakers, automatically execute the multi-view mode as shown in FIG. 8B, and provide outputs according to the voice data of the first speaker and the voice data of the second speaker on the multi-view screen areas.

In FIG. 8A, when the current playback mode is the single-view mode rather than the multi-view mode as a result of the determination in step S105, the display device 100 may be configured to perform STT processing on the voice data of a specific speaker and transmit a result of STT processing to the NLP (S111).

Thereafter, the display device 100 may be configured to receive the NLP response and perform an operation according to the received NLP response through a screen as shown in FIG. 8C (S113).

Referring to of FIGS. 8A and 8C, in step S111, a specific speaker may be regarded as, for example, a main speaker. The main speaker may be determined to be one of the multi-speakers, for example, a speaker currently logged-in to the display device 100, a speaker having a higher relevance to the content currently being played on the screen, a speaker having a relatively higher preset speaker priority, or the like, according to various methods. For example, in FIG. 8C, it can be seen that weather information is output on the content currently being played. In this case, for example, since weather information requested by the main speaker is content capable of being processed or output simultaneously with the content currently being played on the display device 100, the weather information has been provided on the content being currently played, as shown in FIG. 8C. However, unlike the above description, when the operation (e.g., content) requested by the main speaker is incapable of being simultaneously processed or output simultaneously with the content currently being played on the display device 100, the content being currently played may be replaced with the operation requested by the main speaker unlike FIG. 8C. In this case, the content that had been played and is being replaced may be, for example, in a standby state in a background while playback of the content is suspended.

When the operation (content) included in the NLP response is incapable of being simultaneously processed or output simultaneously with the content being currently played in the display device 100 and the content being currently played is needed to be replaced eventually, a speaker who has requested the operation (content) capable of being output together with the content being currently played or the speaker's voice data may be processed with a relatively higher priority.

At the time of processing the voice input of multi-speakers, the display device 100 may be configured to obtain state information of a resource, and select a specific speaker as the main speaker based on the state information of the resource with respect to the voice input of the multi-speakers.

The contents mentioned in each of the above-described embodiments function as weights and are given weights according to the settings, so that the display device 100 may be configured to use the weight values or the sum thereof in various determination processes described in this specification.

Next, referring to FIG. 9, when a voice input is received (S201), the display device 100 may be configured to determine whether the current playback mode is the multi-view mode (S203).

When the current playback mode is the multi-view mode as a result of the determination in step S203, the display device 100 may be configured to determine whether the voice data of multi-speakers is included in the received voice input (S205).

When it is determined in step S205 that the received voice input is a single-speaker input, the display device 100 may be configured to select or determine a multi-view screen area to which the single-speaker input is to be output (S207).

The display device 100 may be configured to process content according to the single-speaker input (S211), and output the processed content to the multi-view screen area selected or determined through the step S207 (S213).

In relation to step S207, the display device 100 may be configured to refer to at least one of information about a speaker linked (or mapped) to each multi-view screen area and content information being played in each multi-view screen area. For example, when the multi-view screen areas are respectively assigned to different users, and speakers linked to the multi-view screen areas are different, it is preferable to output the processed content to the multi-view screen area assigned to a user matching the speaker of the single-speaker input.

Referring to FIG. 9B, in a case where a first multi-view screen area 910 is assigned to a first speaker and a second multi-view screen area 920 is assigned to a second speaker, when a single-speaker input is the voice input of the first speaker, content may be provided to the first multi-view screen area 910 which is the area assigned to the first speaker, although there is no content being output on the second multi-view screen area 920. When there is no content being output in the second multi-view screen area 920, unlike the above case, content corresponding to the voice input of the first speaker may be played in the second multi-view screen area 920 until a content play request by the second speaker is received.

When it is determined in step S205 that the received voice input is a multi-speaker input, the display device 100 may be configured to select or determine each multi-view screen area 930 and 940 on which each multi-speaker input is to be output (S209).

The display device 100 may be configured to process content according to each multi-speaker input (S211), and output the processed content in the multi-view screen area 930 or 940 selected or determined through the step S209 as shown in FIG. 9C (S213).

Referring to FIGS. 9A and 9C, the display device 100 may be configured to determine an output screen area according to a corresponding speaker when the speaker linked to a multi-view screen area 930 or 940 matches a multi-speaker identified in the received voice input. However, when at least one speaker among the multi-speakers does not match the speaker linked to the multi-view screen area 930 or 940, the display device 100 may be configured to select or determine a specific multi-view screen area for a corresponding multi-speaker by referring to information on content being played or information on speakers linked to the multi-view screen area 930 and 940.

For example, it is assumed that the received voice input includes the voice input of multi-speakers, that is, the speaker 1 and speaker 2, the voice input of the speaker 1 is a request for execution of application B, and the voice input of the speaker 2 is a request for weather information, the first multi-view screen area 930 is linked to the speaker 1, application A is being executed, the second multi-view screen area 940 is linked to the speaker 3, and a news application is being executed. In the above case, the voice input of the speaker 1 may be output to the first multi-view screen 930 as it is. However, in the case of the speaker 2, since the second multi-view screen 940 is currently linked to the speaker 3, a processing method thereof is required.

In this case, the display device 100 may be configured to determine whether the property of the content being provided on the second multi-view screen area 940 and an operation according to the voice data of the speaker 2 are able to be simultaneously output, and simultaneously provide content of two speakers may be based on a result of the determination. For example, since the speaker 2 has requested weather information, and the second multi-view screen area 940 is related to a news application currently being output for the speaker 3, simultaneous output is possible, so that the display device 100 may be configured to perform simultaneous output as shown in FIG. 9C.

On the other hand, based on a result of determination as to whether the property of the content being provided on the second multi-view screen area 940 and an operation according to the voice data of the speaker 2 are able to be simultaneously output, the display device 100 may need to provide any one content alone.

The display device 100 may be configured to refer to the speaker priority information of the speaker 2 and the speaker 3.

The display device 100 may be configured to refer to the importance or content priority information of the content requested by the speaker 2 and the speaker 3.

The display device 100 may be configured to select one of a plurality of speakers in consideration of both the speaker priority information and the importance of the content or the content priority information.

For example, the display device 100 may be configured to determine whether there is an additional input from the speaker 3 during a predetermined time period, and if not, select the speaker 2 instead of the speaker 3.

The display device 100 may consider a relationship with the content being output in the first multi-view screen area 930. For example, when audio output is requested for the content being output on the first multi-view screen area 930, and audio output is also requested for the content being output on the second multi-view screen area 940, it is necessary to mute one of the audio outputs or output the one audio output through another output means. In this case, it is preferable to output content that does not require audio output to the second multi-view screen area 940, based on which the speaker 2 or the speaker 3 may be selected.

Figure 10:
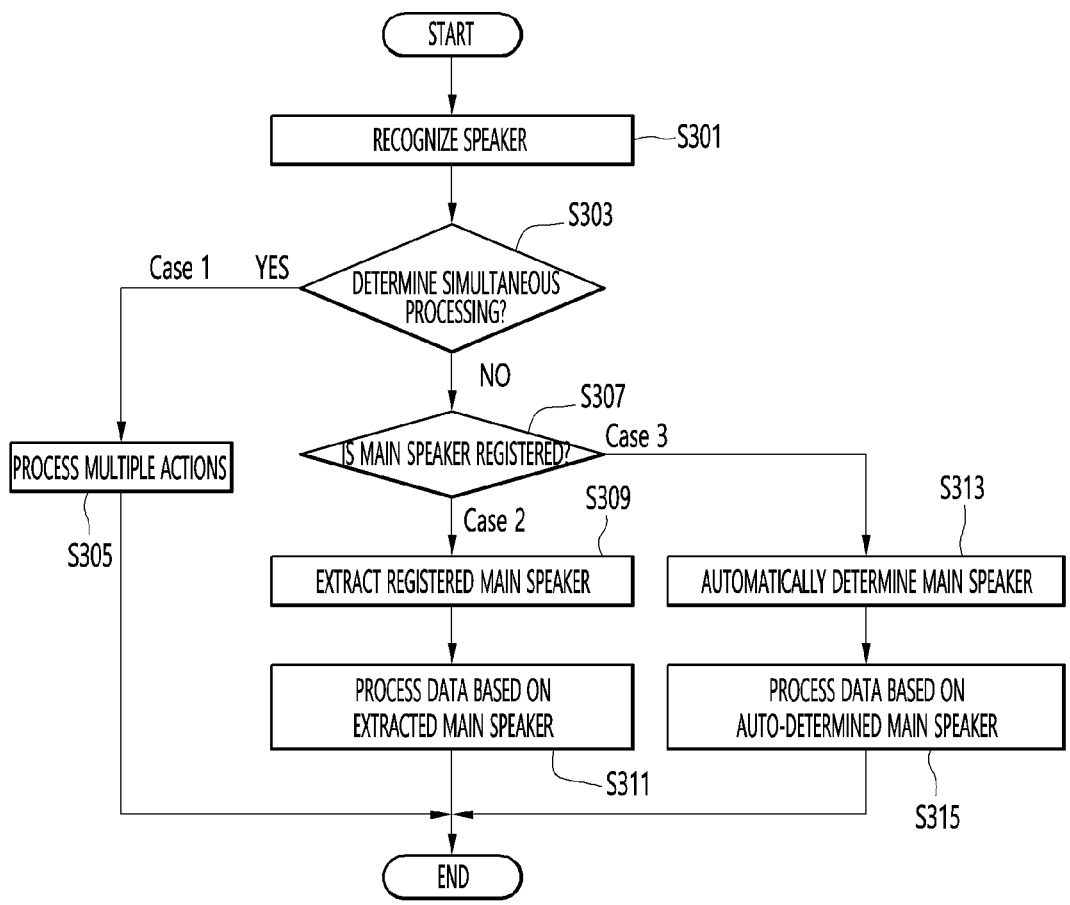

Next, referring to FIGS. 10 and 11, the operation method may be changed depending on whether the voice inputs of the multi-speakers are able to be simultaneously processed (outputted) in the display device 100. For convenience of description, the single-view mode is described as an example in FIGS. 10 and 11, but the present disclosure is not limited thereto.

Referring to FIG. 10, when multi-speakers are recognized (S301), the display device 100 may be configured to determine whether simultaneous processing is possible (S303).

As a result of the determination in step S303, the display device 100 may be configured to perform different operations according to Cases 1 to 3.

In Case 1 in which the voice inputs of the multi-speakers are simultaneously able to be processed, the display device 100 may perform multi-action processing (S305), and provide a result of the multi-action processing on a screen as shown in FIG. 11A.

For example, overlay applications that can be displayed on another full-size application may include a weather card application and a time card application. Accordingly, the display device 100 may be configured to determine whether simultaneous processing is possible based on whether an overlay card can be simultaneously executed on a full card.

Referring to FIG. 11A as an example, the weather overlay card 1112 may be output together on the YouTube full-size card 1111. In this case, it may be determined that simultaneous processing is possible.

When the voice inputs of the multi-speakers cannot be simultaneously processed, the display device 100 may be configured to again determine whether main speaker information is registered (S307).

Referring to FIG. 10, Case 2 is a case in which simultaneous processing is impossible but a main speaker is registered, and Case 3 is a case in which simultaneous processing is impossible and a main speaker is not registered, When it is determined in step S307 that the main speaker is registered (Case 2), the display device 100 may be configured to extract voice data of the registered main speaker (S309), and perform an operation according to the main speaker's voice data extracted main speaker as shown in FIG. 11B (S311).

On the other hand, when the main speaker is not registered as a result of the determination in step S307 (Case 3), the display device 100 may be configured to automatically determine the main speaker (S313), extract the voice data of the the determined main speaker, and perform the corresponding operation as shown in FIG. 11C (S315).

'Whether simultaneous processing is possible' described in this specification may be determined in various ways based on the settings of a server or user or learning results, and various factors such as speaker information, content information, time or space information, and environment information may be reflected. For example, when the voice inputs of the multi-speakers are an execution request for a first video application and an execution request for a second video application, respectively, the display device 100 may be configured not to simultaneously process two video application execution requests due to resource issues or the like. Therefore, this case may be regarded as a case in which simultaneous processing is impossible.

Referring to FIG. 12A, the display device 100 may be configured to output the first video data of the first content of the first application to the first multi-view area 1210 and play the eighth video data of the same content of the same application on the second multi-view area 1220.

In this case, when the same content of the same application or video data of a different series are assigned to the first multi-view area 1210 and the second multi-view area 1220 in the display device 100, there may be interference with viewing of at least one speaker. Accordingly, in the above case, the display device 100 may be configured to determine a main speaker and output one content requested by the main speaker. That is, the display device 100 may be configured to determine that simultaneous processing is impossible in the above case.

On the other hand, in the case of FIG. 12A, the display device 100 may be configured to determine that simultaneous processing is impossible as described above even when pieces of content respectively output on the multi-view areas are same and applications executed to provide the content are different from each other.

Referring to FIG. 12B, the display device 100 may be configured to assign a first application to the first multi-view area 1230 and assign a second application to the second multi-view area 1240. In this case, the display device 100 may be configured to determine whether simultaneous processing is possible or impossible. For example, when there is no particular setting, the display device 100 may be configured to determine whether the two applications can be simultaneously processed according to, for example, resource state information. Referring to FIG. 12B, for example, when video application execution requests are assigned to both multi-view areas 1230 and 1240 and resources are sufficient to process both video applications together, the display device 100 is able to perform simultaneous output. However, in this case, audio processing may be a problem, and when there are no settings for audio processing, the display device 100 may be configured to determine that simultaneous processing is impossible, determine a main speaker and perform simultaneous processing and output.

Referring to FIG. 12C, the display device 100 may be configured to allocate a first application to the first multi-view area 1250 and allocate a second application to the second multi-view area 1260. In addition, the applications respectively allocated to the multi-view areas are an Internet application and a video application, and when there is no particular setting, the display device 100 may be configured to determine that simultaneous processing is possible.

Figure 12:
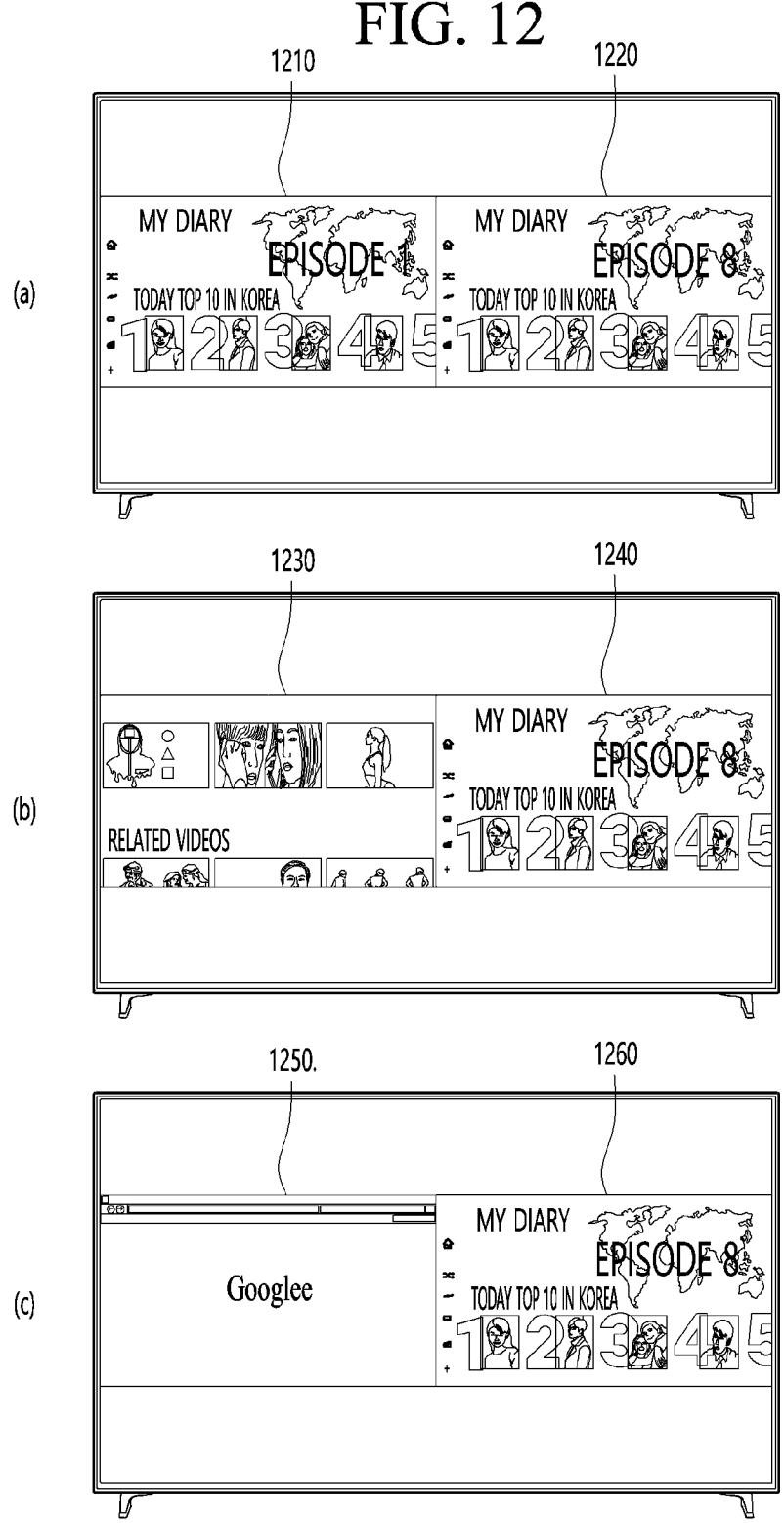

Meanwhile, in FIG. 12, the allocation to each multi-view screen may be performed based on the voice inputs of multi-speakers.

Referring to FIG. 13A, when a voice signal is received (S401), the display device 100 may be configured to determine whether multi-speaker voice data is included in the voice signal. According to a result of the determination, the display device 100 may be configured to perform separation on a voice signal in case of multi-speakers or process a voice signal of a single-speaker.

In this case, when the voice signal includes multi-speaker voice data, the display device 100 may be configured to determine a main speaker from among the multi-speakers (S403).

When the main speaker is identified through the step S403, the display device 100 may be configured to read routine information for the main speaker as shown in FIG. 13B (S405). The routine information is, for example, information previously stored in a memory, a DB, or the like, and may be information prepared based on a speaker and a wake-up word (or a trigger word). For example, information in which a speaker-wake-up word-routine is mapped is exemplified in FIG. 13B, but the present disclosure is not limited thereto.

Referring to FIG. 13B, the display device 100 may be configured to perform and store mapping on the routine of "Switching news channels—Watching weather" for wake-up word "good morning" and perform mapping on the routine of "Executing gallery—Watching tomorrow weather—Turning off TV in 30 minutes" for wake-up word "good night" with respect to speaker "A".

On the other hand, referring to FIG. 13B, the display device 100 may be configured to perform and store mapping on the routine of "playing YouTube music—Watching weather" for wake-up word "good morning" and perform and store mapping on the routine of "playing YouTube music—Turning off TV in 30 minutes" for wake-up word "good night" with respect to speaker "B".

The display device 100 may be configured to call at least one application corresponding to read routine information (S407) and output content by executing the application (S409).

As described above, when the main speaker is speaker "B" and the wake-up word is "good morning", the display device 100 may be configured to play YouTube music and then output weather information according to the read routine information.

When the current playback mode is a single-view mode, the display device 100 may be configured to call and execute two applications simultaneously as shown in FIG. 13C, and overlay and provide one application execution screen 1320 on another application execution screen 1310. Although the display device 100 simultaneously calls and executes a plurality of applications included in the routine information in FIG. 13C, but the present disclosure is not limited thereto. For example, each application execution screen included in the routine information may be overlaid and output on an application screen that is being played on the display device 100 irrespective of the routine information. In this case, for example, the display device 100 is able to output the two applications at the same time, but in other cases, the applications included in the routine information may be executed instead of the previously executed application. In the latter case, as shown in FIG. 13D, the display device 100 may be configured to switch to the multi-view mode and perform simultaneous output. In this case, the display device 100 may be configured to execute one application according to the routine information, and when the execution of the corresponding application is terminated (or terminated after execution for a preset time), subsequently execute another application defined in the routine information. As described above, whether a plurality of mapped applications is simultaneously provided or sequentially provided may be determined according to, for example, an attribute of each application in the routine information, with reference to the routine information.

When the current playback mode is the multi-view mode, the display device 100 may be configured to simultaneously execute two applications and map the two applications to multi-view screens 1330 and 1340, respectively, and then provide the multi-view screens, as shown in FIG. 13D. In this case, the allocation of the screen areas to the applications may be arbitrary, and may be determined according to the speaker's input or the speaker's current location after the screens are provided. Alternatively, when three or more applications are included in the routine information, any one of the two screen areas may be selected and the remaining application may be executed after the application executed in the corresponding screen area is terminated. For example, when the total playback time of the content on the first screen area is one hour and the total playback time of the content on the second screen area is 30 minutes, the display device 100 may be configured to allocate the second screen as the execution screen of the remaining application.

Step S403 in FIG. 13A described above may not be necessary. For example, the display device 100 may be configured to determine a main speaker when there are multi-speakers and the current playback mode is the single-view mode, and skip step S403 when the current playback mode is the multi-view mode.

Meanwhile, the routine information of FIG. 13B is an example, and is not limited thereto. For example, the wake-up word may not be considered. Current time information, content information, or the like may be considered instead of the wake-up word. The display device 100 may be configured to continuously update and store such routine information with reference to training through an AI learning model, feedback (e.g., motion, voice input, etc.) of each speaker, or the like.

Although category information is just defined for each speaker in FIG. 13B, specifically, which content or information of a corresponding category (or application) is to be output may be defined in more detail.

Referring to FIG. 14A, when the current playback mode is the multi-view mode, the display device 100 may be configured to allocate a first view area 1410 to a user A and a second view area 1420 to a user B.

The display device 100 may be configured to detect a user periodically or aperiodically, and when a specific user among the user A and the user B is identified as being away from the seat as a result of the detection, perform a process according to a result of the identification. The process may be differently performed depending on whether, for example, the user who is away from the seat is the main speaker.

Figure 14:
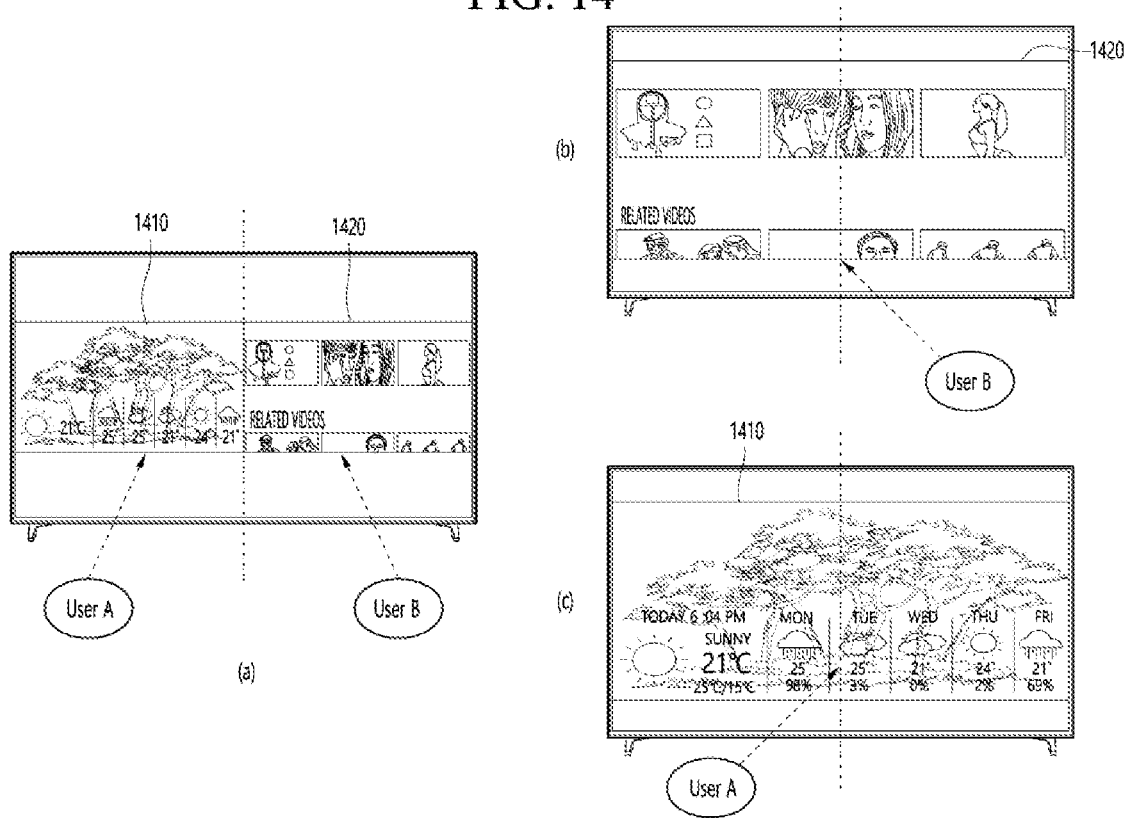

For convenience of description, it is assumed that the main speaker in FIG. 14 is the user A.

When it is identified that the user A who is the main speaker is is away from the seat, the display device 100 may be configured to maintain the multi-view mode as before, even though the user B is continuously detected as shown in FIG. 14B. However, in this case, the playback of content for the user A, who is the main speaker, may be paused, or provided through a mirroring service, or the like. When the mirroring service is provided, the display device 100 may be configured to switch to the full screen for the user B as shown in FIG. 14C. On the other hand, when a time period during which the user A is away from the seat is equal to or longer than a preset time period, the display device 100 may be configured to switch to the full screen for the user B as shown in FIG. 14C.

On the other hand, when it is identified that the user B, who is not the main speaker, is away from the seat, the display device 100 may be configured to switch from the multi-view mode to the single-view mode, that is, the full screen mode, as shown in FIG. 14C. In this case, the content for the user B may be in a standby state in the background as the content for the user B is terminated or playback is stopped or paused.

In the above-described embodiments of the present disclosure, the wake-up word may be referred to in determining a main speaker based on a voice signal including pieces of voice data of multi-speakers.

For example, when a wake-up word such as "Hi LG" is included in the voice signal, the display device 100 may be configured to extract a time-stamp for the wake-up word and determine a corresponding speaker as the main speaker. In this case, the display device 100 may not consider the order (or time order) of the pieces of voice data of the multi-speakers.

On the other hand, in a case in which the pieces of voice data of the multi-speakers include all wake-up words, the display device 100 may be configured to extract each time-stamp as described above, select the speaker of voice data which is first input as the main speaker based on the time-stamp, and ignore the wake-up words and voice data of other speakers. However, when the display device 100 is in the multi-view mode, the wake-up word of voice data which is input later and the and voice data may be a target on which extraction and processing are to be performed. In the latter case, the display device 100 may be configured to extract and process the wake-up word of voice data which is input later and the voice data even when the display device 100 is not in the multi-view mode, but the display device 100 may be configured to perform output of the voice data when the playback according to the input data which is input previously has been stopped and completed.

When the wake-up words are respectively included in the pieces of voice data of the multi-speakers, the main speaker may be determined by referring to priority information of a command or request following each wake-up word regardless of the order thereof.

When the wake-up words are respectively included in the pieces of voice data of the multi-speakers, the main speaker may be determined according to priority information of each speaker or signal levels for the wake-up words.

When the wake-up words are respectively included in the pieces of voice data of the multi-speakers, the main speaker may be determined based on the relation between the command or request following each wake-up word and the currently played content of the display device 100.

When the wake-up words are included all in the pieces of voice data of multi-speakers, the main speaker may be determined based on the current location of the display device 100, information about a space to which the display device 100 belongs, time information, and the like. For example, when the display device 100 is located in a space called, for example, a kitchen, more weight is given to a specific user (e.g., a cook or a mother) to determine the main speaker. In the above case, space information to which the display device 100 belongs or time information is a factor for determining the main speaker despite the existence of a wake-up word, and the same or more weight (or priority) may be given.

Figure 15:
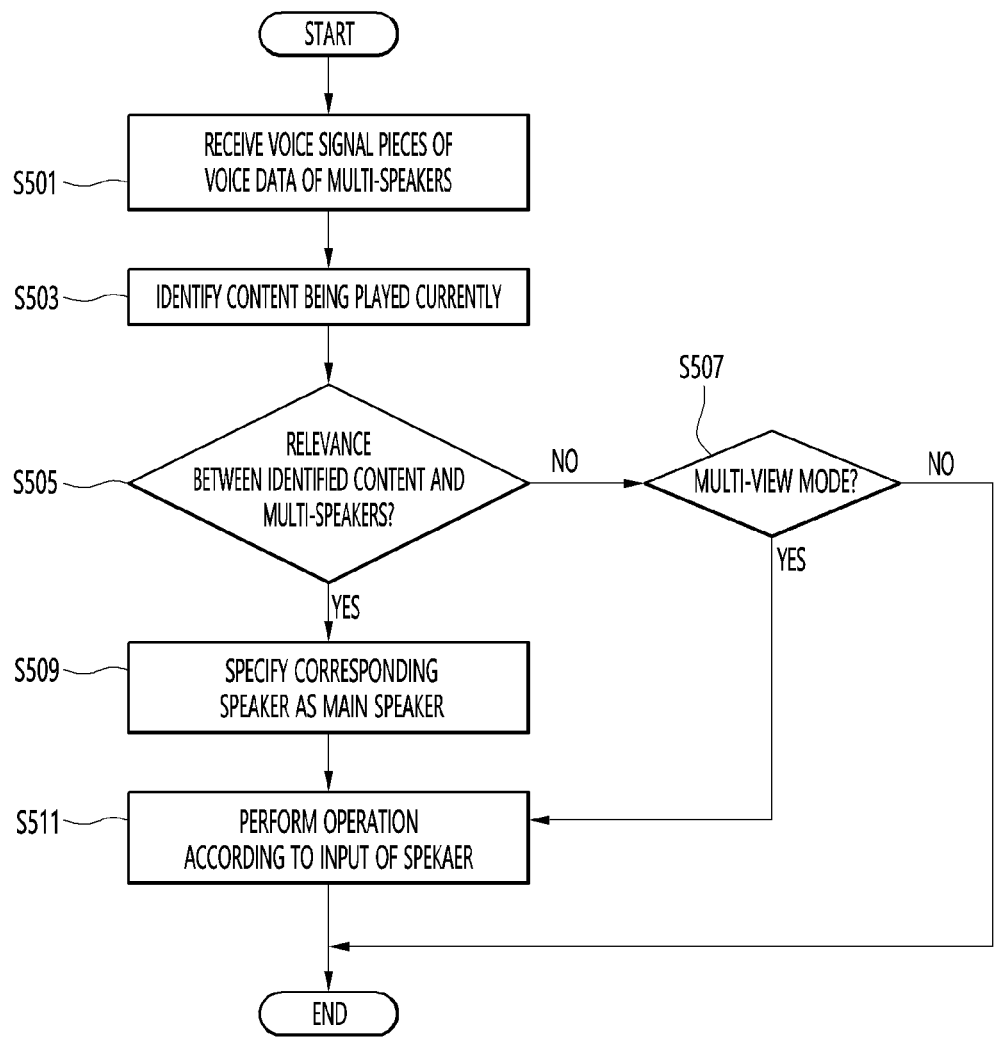
FIG. 15 is a flowchart of a method of processing multi-speaker data according to an embodiment of the present disclosure.

FIG. 15 is a flowchart of a method of processing multi-speaker data according to an embodiment of the present disclosure.

The display device 100 may be configured to receive a voice signal including voice data of multi-speakers (S501).

The display device 100 may be configured to identify content being played through a current screen (S503).

The display device 100 may be configured to determine the relevance between each of the multi-speakers and the content (S505).

As a result of the determination in step S505, the display device 100 may be configured to specify a speaker having higher relevance to the identified content as a main speaker (S507).

The display device 100 may be configured to perform an operation based on voice data of a speaker specified as the main speaker (S509).

Meanwhile, the display device 100 may be configured to determine whether the current playback mode of the display device 100 is a multi-view mode when the relevance between the identified content and the speaker is not significant as a result of the determination in step S505 (S507).

When the current playback mode is the multi-view mode as a result of the determination in step S507, the display device 100 may be configured to map multi-view screen areas to the pieces of voice data of the multi-speakers, and provide operations caused by the inputs of the speakers on the corresponding multi-view screen areas according to the mapping.

The illustrated order of operations of FIGS. 8 to 10, 13 and 15 is an example, and is not limited thereto. In other words, one or more steps in the flowchart may be performed concurrently or may be operated in a different order than shown. In addition, although shown as one step in FIGS. 8 to 10, 13 and 15, the corresponding step may be divided into a plurality of steps and operated, or vice versa.

In addition, although not shown, one or more operations related to the present disclosure may be further performed.

The above description is merely illustrative of the technical idea of the present disclosure, and various modifications and variations may be made without departing from the essential characteristics of the present disclosure by those skilled in the art to which the present disclosure pertains.

According to at least one of various embodiments of the present disclosure, it is possible to separate voice data input from a plurality of speakers into pieces of voice data for speakers and perform processing on the pieces of voice data.

It is possible to separate voice data input from a plurality of speakers into pieces of voice data for speakers and adaptively perform processing on the pieces of voice data depending on situations including a playback mode.

It is possible to separate voice data input from a plurality of speakers into pieces of voice data for speakers and perform operation matching a user's intention to increase convenience of use and product satisfaction.

Therefore, the exemplary embodiments of the present disclosure are provided to explain the spirit and scope of the present disclosure, but not to limit them, so that the spirit and scope of the present disclosure is not limited by the embodiments.

The scope of protection of the present disclosure should be interpreted by the following claims, and all technical ideas within the scope equivalent thereto should be construed as being included in the scope of the present disclosure.

What is claimed is:

1. A method for operating a display device, the method performed by the display device and comprising:
    receiving voice data;
    separating the received voice data into pieces of voice data for a plurality of speakers; and
    performing control such that pieces of content respectively corresponding to the pieces of voice data, which have been separated for the plurality of speakers, are respectively output on corresponding screen areas of multi-view screen areas, when a current playback mode is a multi-view mode,
    wherein the separating the received voice data into each piece of the pieces of voice data for the plurality of speakers includes extracting speaker recognition feature information from a database (DB).

2. The method of claim 1, wherein the separating the received voice data into each piece of the pieces of voice data for the plurality of speakers further includes:
    extracting, from the received voice data, time-stamp information on a part of the received voice data corresponding to the extracted speaker recognition feature information; and
    separating the received voice data into the pieces of voice data for the plurality of speakers based on the extracted time-stamp information.

3. The method of claim 2, wherein the separating the received voice data into each piece of the pieces of voice data for the plurality of speakers includes
    performing speech-to-Text (STT) processing on the each piece of voice data, which have been separated for the plurality of speakers based on the extracted time-stamp information; and
    performing Natural Language Processing (NLP) on the each piece of voice data, which have been separated for the plurality of speakers.

4. The method of claim 1, wherein the performing of the control includes determining the multi-view screen areas respectively corresponding to the pieces of voice data, which have been separated for the plurality of speakers, and performing a mapping of the pieces of voice data to the multi-view screen areas.

5. The method of claim 4, wherein the performing of the control includes extracting content information currently being played in each of the multi-view screen areas.

6. The method of claim 5, wherein the performing of the control includes determining whether simultaneous output is possible based on the extracted content information currently being played on each of the multi-view screen areas voice data mapped to a corresponding multi-view screen area, and outputting corresponding content.

7. The method of claim 6, wherein the performing of the control includes outputting data according to an operation command on one area of a content screen being currently played in the corresponding screen area when an operation command according to the voice data mapped to the multi-view screen area is able to be output simultaneously as a result of determining whether simultaneous output is possible.

8. The method of claim 6, wherein the performing of the control includes outputting data according to an operation command instead of content being currently played in the corresponding screen area when an operation command according to the voice data mapped to the multi-view screen area is able to be output simultaneously as a result of determining whether simultaneous output is impossible.

9. The method of claim 1, further comprising: determining whether requests respectively corresponding to the pieces of voice data separated for the plurality of speakers are able to be processed simultaneously.

10. The method of claim 9, further comprising:
    determining a main speaker from the plurality of speakers and activating a request related to voice data of the determined main speaker alone among the pieces of voice data separated for the plurality of speakers when the requests are unable to be processed simultaneously as a result of determining whether the requests are able to be processed simultaneously.

11. The method of claim 10, further comprising:
    extracting content information currently being played from each of the multi-view screen areas; and
    determining a multi-view screen area to which the activated request related to the voice data of the main speaker based on the content information of each of the multi-view screen areas.

12. The method of claim 11, further comprising:
    determining whether simultaneous output is possible based on content information of the determined multi-view screen area, and, when simultaneous output is possible, outputting data corresponding to a request related to the voice data of the main speaker is output to one area on the content of the corresponding multi-view screen.

13. The method of claim 1, further comprising:
    uploading the pieces of voice data separated for the plurality of speakers to a server; and
    downloading, from the server, NLP responses generated by performing STT processing and NLP on the pieces of voice data separated for the plurality of speakers which have been uploaded.

14. A method for controlling an operation of a display device in a server, the method comprising:
    receiving pieces of voice data for a plurality of speakers;
    extracting speaker recognition feature information from a database (DB);
    performing Speech-to-Text (STT) processing on each of the pieces of voice data for the plurality of speakers;
    performing natural language processing (NLP) on text data on which STT processing has been performed;

generating content information on data on which NLP has been performed; and performing control such that pieces of content according to NLP are respectively output to multi-view screen areas, when a current playback mode of the display device is a multi-view mode.

15. A display device comprising:

a memory; and a processor configured to communicate with the memory, wherein the processor is configured to:

separate input voice data into pieces of voice data for a plurality of speakers by operations that include extracting speaker recognition feature information from a database (DB), and perform control such that pieces of content respectively corresponding to the pieces of voice data, which have been separated for the plurality of speakers are respectively output on corresponding screen areas of multi-view screen areas, when a current playback mode is a multi-view mode.

* * * * *